E. W. N. BOOSEY.
WASTE AND OVERFLOW TRAP.
APPLICATION FILED MAY 20, 1909.
947,786.
Patented Feb. 1, 1910.
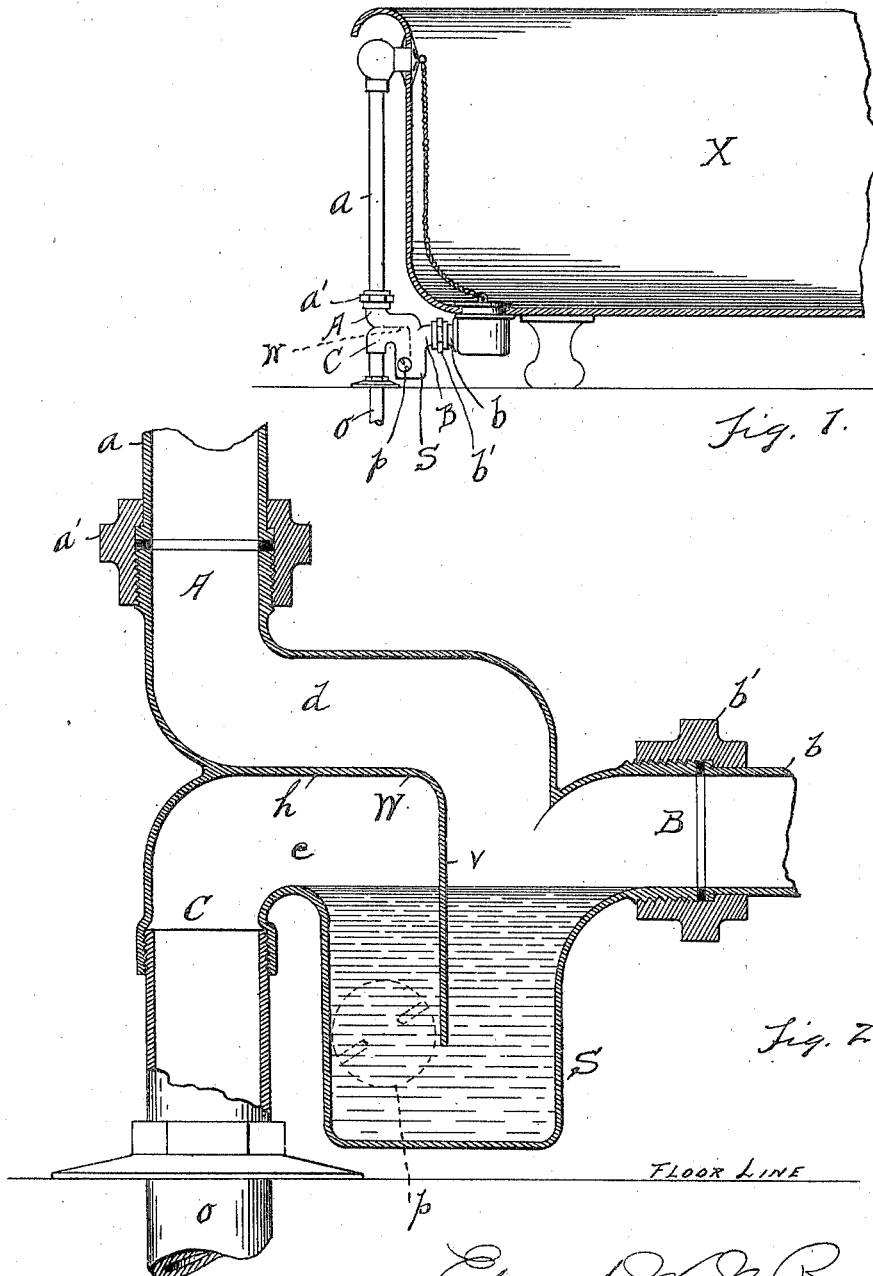

UNITED STATES PATENT OFFICE.

EDWARD W. N. BOOSEY, OF DETROIT, MICHIGAN.

WASTE AND OVERFLOW TRAP.

947,786.   Specification of Letters Patent.   Patented Feb. 1, 1910.

Application filed May 20, 1909. Serial No. 497,344.

*To all whom it may concern:*

Be it known that I, EDWARD W. N. BOOSEY, a citizen of the United States, residing at Detroit, county of Wayne, State of Michigan, have invented a certain new and useful Improvement in Waste and Overflow Traps, and declare the following to be a full, clear, and exact description of the same, such as will enable others skilled in the art to which it pertains to make and use the same, reference being had to the accompanying drawings, which form a part of this specification.

This invention relates to waste and overflow traps and its object is to provide a trap that occupies a minimum amount of space vertically in order that it may be placed under a bath tub and in other positions difficult of access.

It is also an object of this invention to make a trap that has no parts projecting outside the line of piping, the width of the casing being practically the diameter of the piping leading thereinto.

The novelty of the invention consists in the peculiar arrangement of parts hereinafter more fully described and claimed.

In the drawings—Figure 1 is a side elevation of the trap showing part of a bath tub to which it is connected. Fig. 2 is a sectional elevation of the trap.

Similar letters refer to similar parts throughout the drawings and specification.

The trap involves a casing provided with an overflow inlet A, a waste inlet B, and an outlet C. As shown in Fig. 1, the overflow inlet is connected to the overflow of a bath tub X by a pipe $a$ and a union $a'$ and the waste inlet is connected to the waste outlet D of the tub by a pipe $b$ and union $b'$. A dividing wall W is provided within the casing which has a horizontal part $h$ and a vertical part $v$. The horizontal part $h$ lies between the inlet A and the outlet C forming an inlet channel $d$ and an outlet channel $e$, and the vertical part of the partition extends into the seal chamber proper formed at the bottom of the casing and thereby provides a wall between the inlet B and the outlet C. The outlet C is in direct line with the overflow inlet A and the outlet channel is in direct line with the waste inlet B. The seal chamber S is at one side of a direct line between the outlet and the inlet A and below a direct line between the outlet channel $e$ and the inlet B. The outlet channel $e$ being in direct line with the inlet B, the horizontal part $h$ of the partition W is above the center line of the inlet B, and water flowing into the chamber through the inlet B will strike the vertical part $v$ of the partition. The utility of this construction is in preventing the waste water entering the inlet B from backing up into the inlet channel $d$ and as an aid in such prevention, the inlet B may be given a slight downward turn at the point of union with the inlet channel $d$, thereby giving a downward tendency to water flowing therethrough. The inlet B, however, may unite with the channel $d$ at practically a right angle thereto without departing from the spirit of this invention. The seal chamber is provided with a closable opening by means of which the trap may be cleaned. This opening is provided with a plug $p$ of the usual type and is preferably placed on the side of the chamber but may be placed in any convenient position below the water line. The plug $p$ is shown in full lines in Fig. 1 and in dotted lines in Fig. 2. The outlet C is not provided with a union as are the inlets A and B but is preferably tapped for the admission of the outlet pipe $o$ as shown. This construction allows the seal chamber to be made larger than if a union were used.

From the foregoing description, it becomes evident that this trap, while small in compass and having no parts projecting beyond the lines of piping, has a very ample water seal and is admirably adapted to the purpose for which it is designed.

Having thus briefly described my invention, what I claim is—

1. A trap consisting of a casing having two inlets and an outlet, a partition between the inlets and the outlet forming channels in the casing whose area in cross section is practically equal to the area of the outlet, the outlet being in direct line with one of the inlets and the outlet channel being in direct line with the other inlet, and a chamber below the outlet channel having a closable opening and into which the partition extends, substantially as shown and described.

2. In a waste and overflow trap, a casing having two inlets and an outlet, a partition between said inlets and the outlet, and a seal chamber having an outlet channel in direct line with one of the inlets; said partition having a horizontal and a vertical part, the vertical part extending into the seal chamber, one of said inlets being opposite the horizontal part of the partition and the other inlet being below said horizontal part and opposite the vertical part of said partition, substantially as shown and described.

3. A waste and overflow trap consisting of a casing having two inlets and an outlet, a partition between the inlets and the outlet forming channels in the casing the cross sectional area of which is practically equal to the area of the outlet or the inlets, one of said inlets being in direct line with the outlet and the other inlet being in direct line with the outlet channel, and a water seal chamber below the outlet channel provided with a closable opening, substantially as shown and described.

4. A waste and overflow trap consisting of a casing having two inlets, an outlet, and a closable opening, a partition between the inlets and the outlet having a horizontal and a vertical part forming channels in the casing whose cross sectional area is practically equal to the area of the outlet, and a water seal chamber below the horizontal part of the partition; the two inlet channels uniting at a point between the horizontal part of the partition and the water line of the seal chamber and being arranged to direct water flowing therethrough downwardly into the seal chamber, substantially as shown and described.

In testimony whereof, I sign this specification in the presence of two witnesses.

EDWARD W. N. BOOSEY.

Witnesses:
   CHAS. E. WISNER,
   EDWARD F. GARDNER.